United States Patent [19]

McConnell et al.

[11] Patent Number: 4,759,185
[45] Date of Patent: Jul. 26, 1988

[54] OPERATOR PRESENCE SWITCH WITH SERVICE BY-PASS

[75] Inventors: Kenneth C. McConnell; Steve H. McBee; Bruce L. Hubbard, all of Ankeny, Iowa

[73] Assignee: Deere & Company, Moline, Ill.

[21] Appl. No.: 98,163

[22] Filed: Sep. 18, 1987

[51] Int. Cl.$^4$ .............................................. F16D 31/02
[52] U.S. Cl. ........................................ 60/444; 56/10.2; 60/427; 60/494; 180/306; 180/307
[58] Field of Search ................. 60/443, 444, 423, 420, 60/427, 486, 494; 180/273, 306, 307, 308; 56/10.2, 28

[56] References Cited

U.S. PATENT DOCUMENTS

| | | | |
|---|---|---|---|
| 3,500,946 | 3/1970 | Boyajian | 180/273 |
| 3,587,765 | 6/1971 | McFarland | 60/444 X |
| 3,633,700 | 1/1972 | Matthews | 60/443 X |
| 3,773,156 | 11/1973 | Nyquist | 56/10.2 X |
| 3,881,317 | 5/1975 | Swoager | 60/444 |
| 4,055,047 | 10/1977 | Hara | 60/444 |
| 4,167,855 | 9/1979 | Knapp | 60/487 X |
| 4,294,327 | 10/1981 | Howard | 180/273 |
| 4,392,544 | 7/1983 | Dilno | 180/273 |
| 4,573,319 | 3/1986 | Chichester | 60/427 X |

Primary Examiner—Edward K. Look

[57] ABSTRACT

A control system for terminating the power input to the picking units of a cotton harvester after a short delay by automatically causing a hydrostatic drive to return to neutral. A seat switch and a delay timer electrically connected to a solenoid valve on a servo control system of the hydrostatic pump deactivates the servo system and returns the pump swashplate to a neutral position to stop the unit movement when the operator leaves his seat. Another switch connected in parallel with the operator seat switch is activable when the unit drive is in neutral making the system effective only when the picking units are engaged. A service bypass circuit is provided which, when the hydrostatic lever is in a special low speed position and when the main ground drive of the transmission is in neutral, permits the units to be operated at a relatively slow speed by depressing a remotely located switch.

20 Claims, 2 Drawing Sheets

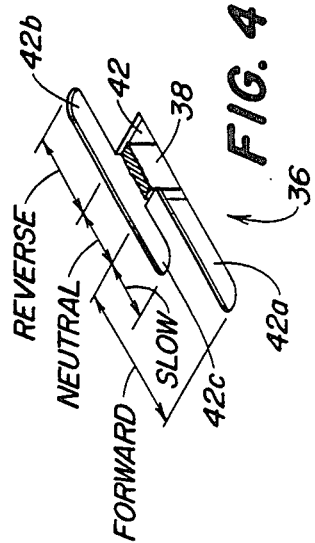
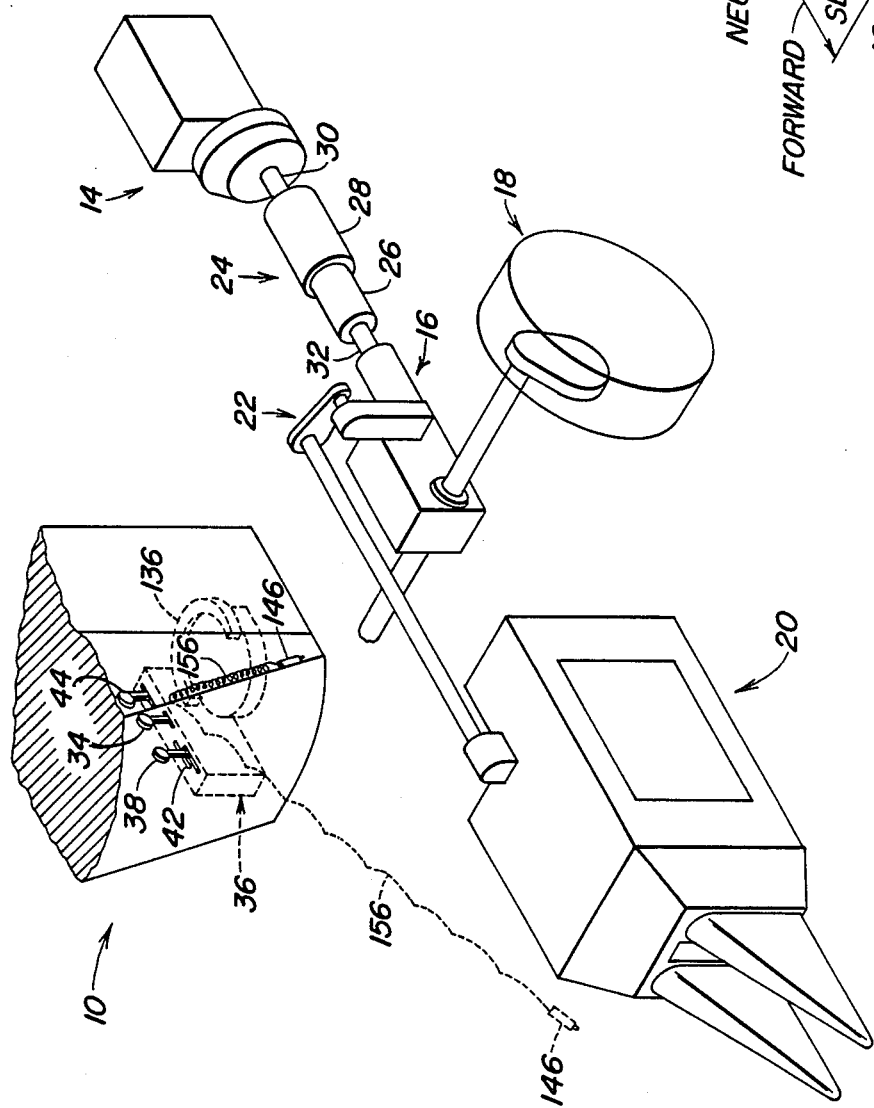

OPERATOR PRESENCE SWITCH WITH SERVICE BY-PASS

BACKGROUND OF THE INVENTION

The present invention relates generally to agricultural harvesting machines, and more specifically, to operator presence devices which are designed to interrupt drive to a harvesting unit or other equipment when the operator leaves the operating station.

In order to help prevent exposure of a user of a self-propelled agricultural harvesting implement to an operating harvesting unit, an operator presence system including a seat switch is sometimes utilized, under limited circumstances, to terminate the power input to the harvesting unit if the operator leaves his seat. Although several operator presence switch systems are available, most suffer from one or more disadvantages. Some systems actually stop the engine when the operator moves from a preselected position, and the momentum of the engine will maintain the harvesting units operational for a short period after cutoff. Unwanted and annoying stoppage can also occur during transporting of the vehicle if an operator shifts his position or is momentarily off the seat while driving the vehicle. There are times when the operator desires to run the harvesting unit slowly for servicing or observation, and, with one of the above mentioned systems, such an operation requires two people, one to operate the machine from the operator station and another to view the harvesting mechanism. Finally, reliability of the system under various operating conditions, is another disadvantage of some of the existing operator presence switch systems.

BRIEF DESCRIPTION OF THE INVENTION

It is therefore an object of the present invention to provide an improved operator presence switch system. It is yet another object to provide such a system which may be selectively bypassed, under certain restricted conditions, for servicing or observation of the driven units on the implement.

It is yet another object of the present invention to provide an operator presence switch system which permits an operator to shift his position or momentarily be out of position without terminating drive to the units but yet which stops the drives before the operator can reach the running units after leaving the operator station. It is a further object to provide such a system wherein the engine remains operating when the drives are terminated. It is still a further object to provide such a system which eliminates unnecessary interruptions in power when transporting the implement with the unit drive disengaged.

It is yet another object of the invention to provide an operator presence switch system for an implement having a driven harvesting unit, wherein the presence switch may be bypassed to operate the harvesting unit at a speed substantially slower than the normal operating speed when the operator is away from his station and when the main ground drive of the transmission is in the neutral position, for extremely limited purposes of servicing and observation.

It is yet another object to provide an improved operator presence switch system for an implement having a hydrostatic drive. It is another object to provide such a system which includes a unique delay timer switching arrangement connected to a solenoid valve on the servo control system of the hydrostatic pump to cause the system to return to neutral when the solenoid is deactivated. It is a further object to provide such a system wherein the solenoid valve may be activated from a location remote from the operator station, under limited circumstances, only when the main ground drive transmission is in neutral and the hydrostatic lever is in a special low speed position for operating the units at a relatively slow speed.

In accordance with the above objects a harvester, such as a cotton picker, is provided with harvesting units connected through a hydrostatic drive to the vehicle engine. A system is provided that terminates the power input to the harvesting units after a short delay after the operator leaves his station by automatically causing the hydrostatic drive to return to neutral. The system includes a seat switch and a delay timer that is electrically connected to a solenoid valve on the servo control system of a hydrostatic pump. When the solenoid valve is deactivated, the servo system returns the pump swashplaite to the neutral position and stops the unit. A second switch is connected in parallel with the seat switch to bypass the seat switch when the unit drive control is not engaged thus making the system effective to shut down the hydrostatic drive only when the harvesting units are engaged. The short delay prior to drive termination allows the operator to shift his position or to momentarily be off is seat, and yet stops the drive before the operator may approach a running unit. Since the hydrostatic drive is controlled, the engine remains operating when the drive is terminated. Also, any failure in the system will deactivate the solenoid and terminate the drive.

To permit the unit drive to be operated slowly for servicing or observation of the harvesting unit, a service bypass system is provided to actuate the solenoid valve under certain restricted conditions. The hydrostatic lever at the operator station includes a special slow speed position for driving the unit at a relatively slow speed compared to the operating speed of the unit. A switch senses the presence of the hydrostatic lever in the special position and is connected in series with a second switch which senses the condition of the main ground drive of the transmission. A control button located either on a tether or solidly mounted on the side of the harvesting unit and accessible from the ground is connected in series with the aforementioned two switches. When the low speed position is selected and the main ground drive of the transmission is in neutral, depressing the control button allows slow movement of the picking unit only while the button is held down.

These and other objects, features and advantages of the present invention will become apparent to those skilled in the art from the description which follows and from the drawings.

BRIEF DESCRIPTION OF THE DRAWINGS

FIG. 1 is a schematic representation of a harvester with the operator presence switch system of the present invention attached thereto.

FIG. 4 is a perspective view of the hydrostatic drive lever arrangement on the operator's console with a portion of the lever removed to more clearly show the slot arrangement.

DESCRIPTION OF THE PREFERRED EMBODIMENT

Figure 2:
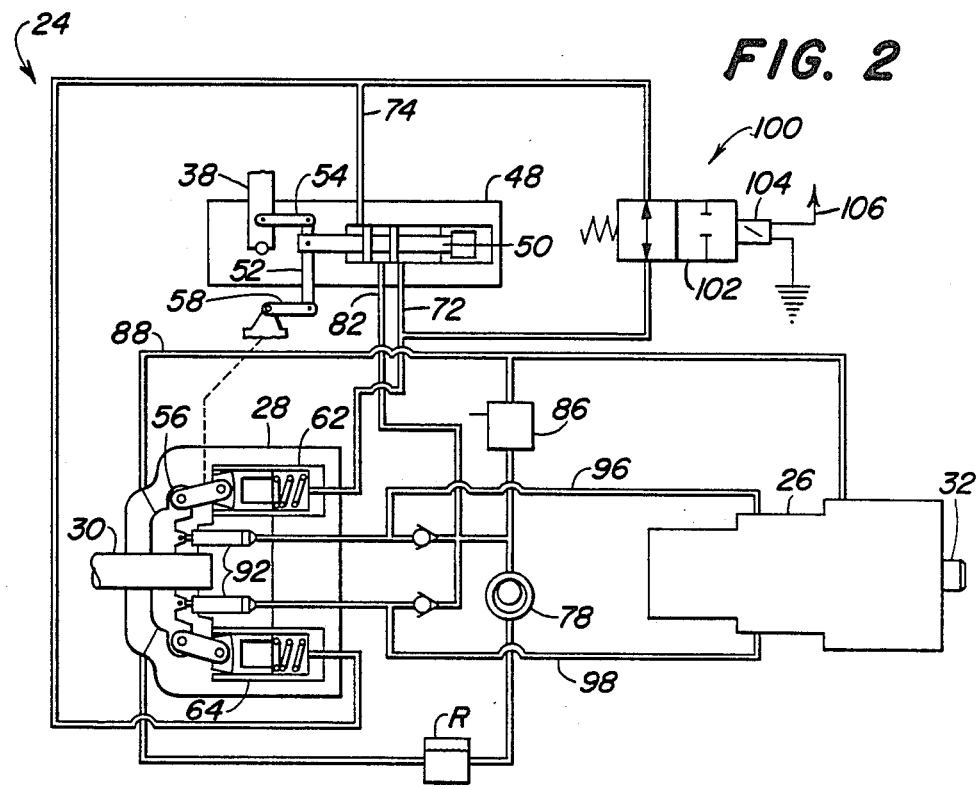
FIG. 2 is a schematic representation of the hydraulic circuit with the destroker valve of the present invention attached thereto.

Referring to FIG. 1, therein is shown a harvester 10 taving an operator station 12 and an engine 14 operably connected through a transmission 16 to drive wheels 18 for propelling the implement forwardly over a field. A harvesting unit 20 is connected to the harvester frame and includes conventional harvesting structure (not shown) driven by a unit drive arrangement 22 by the engine 14. As shown in FIG. 1, the harvester 10 is a cotton picker having the transmission 16 drivingly connected through a hydrostatic drive 24 to the engine 4. Although the present invention will be described in relationship to a cotton harvester, it is to be understood that the invention may also be utilized with other implements having driven units or equipment.

The hydrostatic drive 24 includes a fixed displacement motor 26 driven by a variable displacement pump 28 connected to the engine 14 by a shaft 30. The motor 26 includes an output shaft 32 connected to the transmission 16. The transmission 16 is shiftable from a neutral or park position to a plurality of gear ratios by a main gearshift lever 34 located in a console 36 at the operator station 12. The unit drive arrangement 22 is operably connected through the transmission 16 to drive picker drums (not shown) on the harvesting unit 20 at a speed proportional to the speed of the drive wheels 18. The hydrostatic drive 24 is controlled by a speed control lever 38 movable within a notch 42 on the console 36.

The hydrostatic drive 24 is generally of conventional construction and is of the type utilized, for example, on the John Deere Model 9920 Cotton Picker. A speed range control valve 48 (FIG. 2) includes a spool 50 operably connected to a link 52, the upper end of which is connected through a link 54 to the speed control lever 38. The lower end of the link 52 is connected to a variable swashplate 56 by a link 58 for movement with the swashplate. Spring-biased servo cylinder sleeves 62 and 64, which normally bias the swashplate to a neutral position, are connected via lines 72 and 74, respectively, to the control valve 48. A charge pump 78 supplies oil at control pressure to the control valve 48 via line 82. When the valve 48 is in the neutral position, a pressure relief valve 86 directs oil into the main pump 28 via the line 88. When the valve spool 58 is moved out of the neutral position shown in FIG. 2 by the lever 38, oil at the control pressure from the line 82 is communicated through the selected one of lines 72 or 74 causing the corresponding one of the servo cylinder sleeves 62 or 64 to tilt the swashplate 56 and one direction. Oil expelled by the other one of the servo sleeves returns through the control valve to the pump case via a return line (not shown) connected to the control valve 48. When the swashplate 56 reaches its desired tilt, determined by the position of the speed control lever 38, the control valve spool 50 is returned to its neutral position as shown in FIG. 2. This traps oil to both servo sleeves 62 and 64 and holds the swashplate 56 in the desired tilted position. The swashplate 56 will remain in this position until the speed range lever 38 is moved by the operator. With the pump drive shaft 30 rotating and the swashplate tilted, a reciprocating action is created by pistons 92 in the pump cylinder barrel, generating a flow of oil through lines 96 and 98 to the fixed displacement motor 26. For further details of the hydrostatic drive 24 reference may be had to John Deere Technical Manual, TM-1283 (Dec-83), at pages 250-05-03 through 250-05-05.

Figure 3:
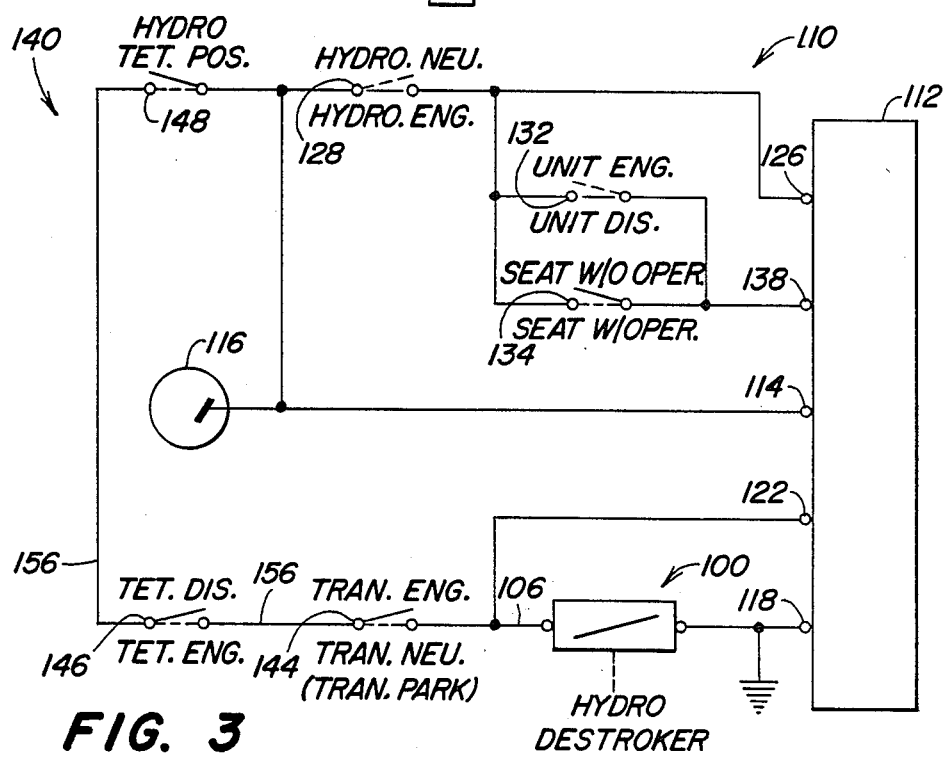
FIG. 3 is a schematic representation of the electrical circuit for controlling the hydrostatic destroker.

In accordance with the teachings of the present invention, a destroker system 100 is connected between the lines 72 and 74 which, as can be appreciated from FIG. 2, causes the swashplate 56 to return to the neutral position when the destroker is open. The destroker 100 includes a solenoid-operated valve 102, biased toward the open position, having a solenoid 104 which is operably connected via terminal 106 to control circuitry 110 (FIG. 3) located at the operator station. When power is supplied to the terminal 106, the valve 102 moves to the left from the position shown in FIG. 2 to a closed position wherein the hydrostatic drive works in a conventional manner. However, if for any reason power is removed from the terminal 106, the valve 102 returns to the open position causing the pressure in the servo cylinder sleeves 62 and 64 to equalize, thereby returning the swashplate 56 to the neutral position.

The control circuitry 110 includes a delay and control circuit 112 having a power input terminal 114 connected to the harvester electrical system through a key switch 116. A terminal 118 is connected to the system ground. A controlled power output terminal is 122 connected to the terminal 106 of the solenoid operated valve 102 of the destroker system 100. A first control signal input terminal 126 is connected to the output terminal of the switch 116 through a switch 128 operably connected to the hydraulic control lever 38. The switch 128 is operated such that when the lever 38 is in the neutral position shown in FIG. 4, the switch 128 is open and when the level 38 is in an operating position other than the neutral position, the switch is closed.

The output of the switch 128 is also connected to the input terminal of a unit engagement switch 132 operably connected to the picking unit engagement lever 44 and an operator presence switch 134 connected to a seat 136 at the operator station 12. The switches 132 and 134 are connected in parallel with each other between the first control signal input terminal and a second control signal input terminal 138.

With the hydraulic speed control lever 38 in the neutral position, the switch 128 is open and no signals appear at the control inputs 126 and 138 of the circuit 112. The output terminal 122 remains at ground level and therefore the solenoid operated valve 102 will remain in the open position as shown in FIG. 2. The control circuit 112 provides an output at the power output terminal 122 initially only on the occurrence of a voltage at both the terminals 126 and 138. Therefore, with the hydraulic control lever 38 engaged and the switch 128 closed with the key switch 116 on, at least one of the switches 132 and 134 must be closed to power the solenoid 104 of the destroker system 100. The switch 132 is closed when the picking unit engagement lever 44 is in the disengaged position and opened when the lever is in the engaged position. The switch 134 is closed when the operator is seated on the seat 136 and is open when the operator leaves his seat. Therefore, if the level 38 is engaged in other than the neutral position and either the operator is in his seat 136 or the unit engagement lever 44 is disengaged, signals will appear at both the terminals 126 and 138, and power will be supplied via the output terminal 122 to the solenoid 104 of the valve 102. The valve 102 will move to its closed position so that the hydrostatic drive 24 can operate normally. However, if the unit engagement lever 44 is in the engaged position so that the switch 132 is open, and if the operator leaves his seat 136 causing the switch 134 to open, power will be removed from the terminal 138. A delay is built in to the circuit 112 so that after several seconds, power will be removed from the terminal 122 and the solenoid operated valve 102 will again return to the open position as shown in FIG. 2, causing the swashplate 56 to return to the neutral position thereby stopping the motor 26. The delay built into the circuit 112 is sufficiently short so that the operator cannot leave the station 12 and reach the harvesting unit 20 before the unit drive arrangement 22 is completely stopped. With the harvesting unit 20 disengaged, the switch 132 will be in the closed position so that the operator is free to leave his seat without stopping the drive.

The control circuitry 110 includes a service bypass circuit 140 connected between the output of the key switch 116 and the input terminal 106 of the solenoid 104. The service bypass circuit 140 is connected such that if the main gearshift lever 34 is in the neutral or park position, and if the speed control lever controlling the hydrostatic drive 24 is in a special low speed position, to be described in detail later, then the harvesting unit 20 can be operated slowly while a switch located remotely from the operator station is held in a closed position. The service bypass circuit 140 includes a ground drive transmission switch 144 connected in series with a remote or tether switch 146 and a hydrostatic speed control lever switch 148. The switch 144 is connected such that when the transmission is in neutral or park, the switch will be closed and when the transmission 16 is engaged, the switch will be open. The switch 146 is a normally open push button switch which, as shown in FIG. 1, is connected by a tether 156 to the remainder of the service bypass circuit 140. Alternatively, the switch 146 may be fixed to the harvester adjacent the harvesting unit 20.

The speed control lever switch 148 is operably connected to the speed control lever 38. The speed control lever 38 is confined for movement from a neutral shift gate position as shown in FIG. 4 to a range of forward drive positions along slot portion 42a for controlling the swashplate 56 to drive the motor 26 in the forward direction. The lever 38 is also movable in a conventional manner to the right and rearwardly of neutral into a notch portion 42b for providing a slow range of reverse speeds. However, in accordance with the teachings of the present invention, a slow forward tether position located forwardly of the reverse position as defined by a notch 42c is also provided for operating the motor 26 at a relatively slow forward speed. Only when the lever 38 is moved to the right and up into the tether position in the notch 42c will the speed control lever switch 148 move to the closed position. Therefore, to activate the service bypass circuit 140, the ground drive transmission must be in the neutral or parked position to close the switch 144 and the lever 38 must be in the tether position in the notch 42c to close the switch 148. The operator may leave the operator station 12, taking the tethered switch 146 with him, and move into the vicinity of the harvesting unit 20. By depressing the switch 146, with the switches 146 and 148 in the closed position as previously described, power will be provided to the terminal 106 to move the solenoid operated valve 102 (FIG. 2) to the closed position to thereby operate the hydrostatic drive 24 at the relatively slow forward speed to slowly drive the mechanisms on the harvesting unit 20 for inspection or service. If the switch 146 is released, or if for any reason the lever 38 moves from the tether position in notch 42c or the transmission inadvertently is engaged, power will be removed from the terminal 106 and the hydrostatic drive will again return to the neutral position removing all power to the drives.

Having described the preferred embodiment, it will be apparent that modifications can be made without departing from the scope of the invention as defined in the accompanying claims.

We claim:

1. In an implement having a main frame, an operator station, a harvesting unit connected to the frame and including an operable drive assembly for driving the harvesting unit, an operator control located at the operator station for operating the drive assembly in a selected one of a plurality of speeds including a field working speed for normal harvesting operations and a slow speed substantially slower than the field working speed, an engageable implement drive train for driving the implement, and a drive control located at the operator station for selectively engaging and disengaging the drive train;

first means associated with the operator control and responsive to the speed selection;

second means associated with the drive control and responsive to engagement and disengagement of the drive train; and control means operably associated with the first and second means for operating the drive assembly at a location remote from the operator station when the drive train is disengaged and the drive assembly slow speed is selected.

2. The invention as set forth in claim 1 further including operator presence switch means for normally preventing operation of the drive assembly when the operator is away from the operator station, wherein said control means is operable to override said switch means and operate the drive assembly at the slow speed when the operator is away from the operator station.

3. The invention as set forth in claim 1 wherein the operator control comprises a speed control lever operably connected to a hydrostatic drive, said lever selectively positionable in a first slot for operating the hydrostatic drive over a full range of speeds including a high speed corresponding to the field working speed of the drive assembly, and a second slot offset from the first slot for operating the hydrostatic drive at a speed no higher than a speed substantially less than the high speed, and wherein the first means includes switch means activable upon positioning of the lever in the second slot.

4. The invention as set forth in claim 3 wherein the hydrostatic drive includes a speed range control valve and a cylinder-controlled swashplate assembly operably connected to the control valve, and destroker means operably connected to the swashplate assembly and the control means.

5. The invention as set forth in claim 1 wherein the first and second means comprises first and second switches, and the control means comprises a third switch connected to the first and second switches.

6. The invention as set forth in claim 5 wherein the switches are connected in series.

7. The invention as set forth in claim 1 including an engine driven hydrostatic drive connected to the unit drive assembly and drive train, wherein said control means is operably connected to the hydrostatic drive.

8. The invention as set forth in claim 7 wherein the hydrostatic drive includes solenoid operated means for establishing a non-driving neutral position independently of the selected operating speed when the solenoid is deactivated, and operator presence switch means for deactivating the solenoid when the operator leaves the operator station.

9. The invention as set forth in claim 8 wherein the operator control includes a neutral position for removing drive from the unit, and including means for preventing deactivation of the solenoid when the operator leaves the station if the operator control is in the neutral position.

10. The invention as set forth in claim 8 wherein said control means is operable to override the operator switch means when the drive train is disengaged and the drive assembly slow speed is selected.

11. The invention as set forth in claim 10 wherein the first means, second means and control means comprise, respectively, first, second and third switches connected in series with each other and connected to the solenoid.

12. The invention as set forth in claim 11 wherein the third switch is located remotely from the operator station.

13. The invention as set forth in claim 2 wherein the control means includes a switch connected to a tether at the operator station, said switch being movable by the operator to a location adjacent the harvesting unit.

14. The invention as set forth in claim 8 wherein said operator presence switch means includes a delay circuit for providing a short delay after the operator leaves the station before deactivation of the solenoid.

15. In an implement having a main frame, an engine, an operator station, a harvesting unit connected to the frame and including an operable unit drive assembly having a control for engaging and disengaging the unit drive for selectively driving the harvesting unit, an engageable and disengageable implement drive train for selectively driving the implement forwardly over the ground, main drive means for selectively connecting and disconnecting the engine and the drive assembly and drive train, an operator presence switch system including:

first means operably associated with the unit drive assembly for indicating engagement or disengagement of the unit drive;

second means located at the operator station for indicating presence or absence of an operator at the station;

means for removing drive from the harvesting unit when the operator leaves the station with the unit drive engaged and engine running including control circuit means operably connected to the main drive means and to the first and second means for disconnecting the running engine from the drive assembly and drive train when the absence of an operator at the station and the engagement of the unit drive are indicated.

16. The invention as set forth in claim 15 wherein the control circuit means includes a delay for preventing said disconnecting of the running engine for a short time period after the operator leaves the station.

17. The invention as set forth in claim 15 including remotely operable means for selectively connecting the engine and the drive assembly at a location remote from the operator station when the drive train is disengaged and the operator is away from the station.

18. The invention as set forth in claim 17 wherein the main drive means includes speed control means for selectively operating the unit over a range of speeds from a normal harvesting speed to a slow speed substantially slower than the harvesting speed, and wherein the remotely operable means includes means for remotely connecting the engine and the drive assembly only when the slow speed is selected to thereby prevent operation of the unit at a speed higher than the low speed when the operator is away from the station.

19. The invention as set forth in claim 18 wherein the main drive means comprises a hydrostatic drive and the means for removing drive includes hydraulic destroker means for selectively establishing the hydrostatic drive in a neutral nondriving condition.

20. The invention as set forth in claim 18 wherein the main drive means comprises a hydrostatic drive and the speed control means comprises a speed control lever connected to a speed control valve, said lever movable in at least first and second slots offset from one another, said second slot corresponding to selection of the slow speed, wherein the remotely operable means is operable to connect the engine and drive assembly only when the lever is in said second slot.

* * * * *